UNITED STATES PATENT OFFICE.

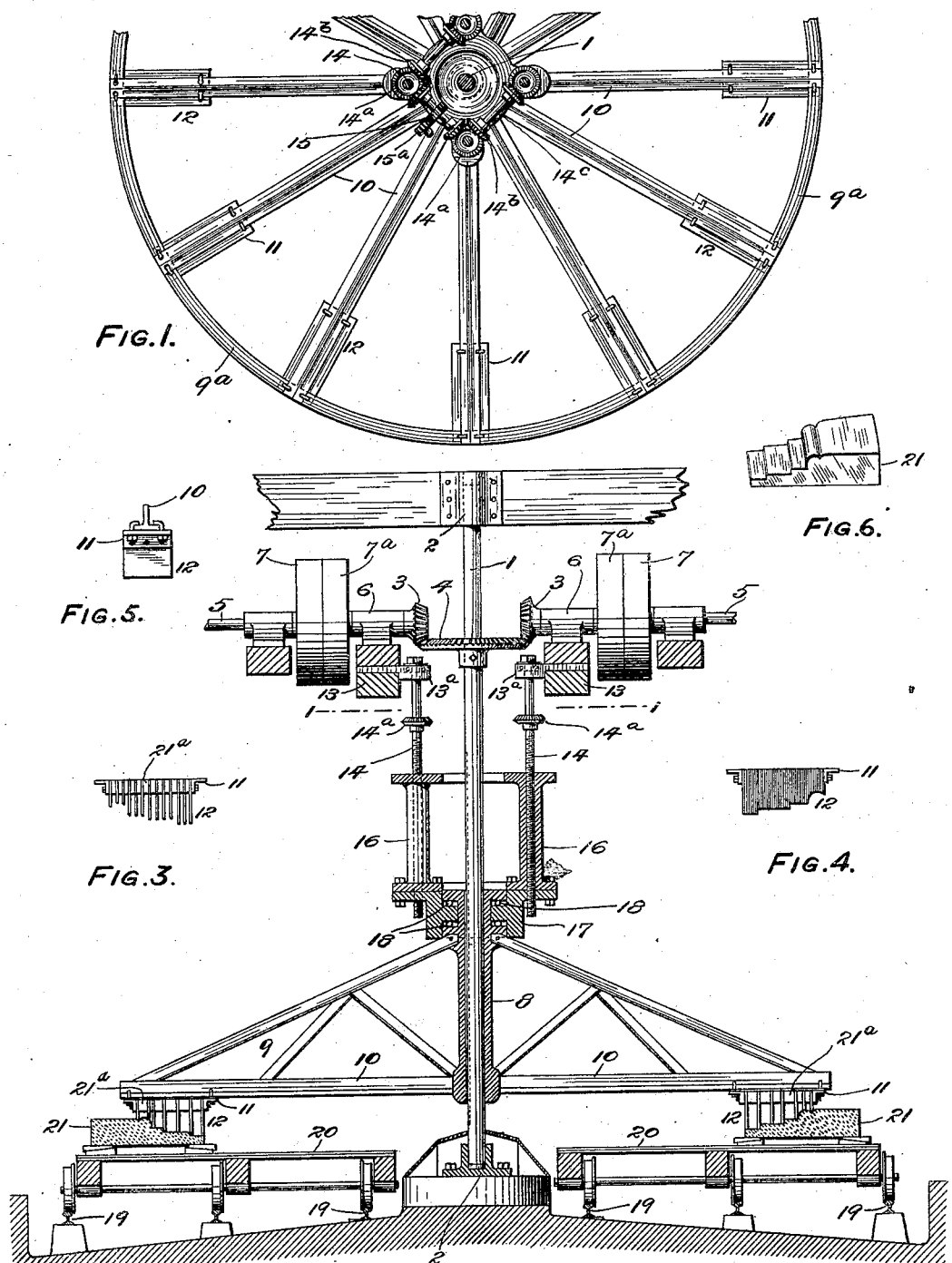

JAMES E. W. BRYNING, OF PHILADELPHIA, PENNSYLVANIA.

APPARATUS FOR MOLDING STONE.

934,791.

Specification of Letters Patent.   Patented Sept. 21, 1909.

Application filed January 6, 1909.   Serial No. 470,907.

*To all whom it may concern:*

Be it known that I, JAMES E. W. BRYNING, a citizen of the United States, residing at the city of Philadelphia, in the county of Philadelphia and State of Pennsylvania, have invented certain new and useful Apparatus for Molding Stone, of which the following is a specification.

Generally stated, the invention consists of apparatus designed for the so called molding of stone, such for instance as granite, marble, blue-stone, lime-stone and the like, and has more particular reference to the treating of substantially circular work, the present invention being related to the invention for which a United States patent was granted to me under date of December 12, 1905, and numbered 806,951.

The principal object of the present invention may be said to be to provide apparatus of a rotary type adapted to cut or mold substantially circular work, in a rapid and comparatively inexpensive manner and in a way to preserve the face of the stone in contradistinction from bruising the surface.

A further object of the present invention is to provide rotary apparatus having a vertical driving shaft radiating from which are a series of beams forming a frame depending from which are a series of sets of short blade-sections, comprising the cutting tools.

A still further object of the present invention is to provide a feed mechanism for raising and lowering the frame carrying the tools with respect to the work.

A still further object of the present invention is to provide suitable means for introducing the work to be done beneath the rotating frame and tools.

A still further object, is to provide convenient means for adjusting the cutting tools with respect to the rotating frame to accommodate work of varying radius and in order that tools may be attached for roughing out, and shaping and finishing the work.

Other objects of the invention relate to general details of construction and arrangement of parts.

The invention consists of the improvements hereinafter described and finally claimed.

The nature, characteristic features and scope of the invention, will be more fully understood from the following description taken in connection with the accompanying drawings forming part hereof and in which:

Figure 1, is a view, in plan taken upon the line 1—1 of Fig. 2. Fig. 2, is a view in elevation principally in section of apparatus embodying the invention. Fig. 3, is a detail view of the shaping tool. Fig. 4, is a detail view of the finishing tool. Fig. 5, is a detail view of the clamping device for the tools, and Fig. 6, is a view of some circular work.

Referring to the drawings, there is illustrated a vertically arranged rotatable shaft 1, journaled in suitable bearings 2, motion being imparted to this shaft by means of beveled gears 3, that mesh with a beveled gear 4, carried by the shaft 1. As clearly illustrated in Fig. 2, the beveled gears 3, are carried by shafts 5, suitably journaled as at 6, and provided with fast and loose pulleys. 7, and 7$^a$. By these parts, the shaft 1, may be positively driven in a steady manner and is capable of transmitting great power. Near the lower portion of the shaft 1, and feathered thereto is a rotatable sleeve 8, having sliding engagement with said shaft by virtue of mechanism hereinafter described. This rotatable sleeve 8, carries a substantially circular frame 9, consisting of beams 10, that are fixed to and radiate from the rotatable sleeve 8, and carry at their free ends a band 9$^a$. In practice the frame 9, and beams 10, have been made of T iron, (see Fig. 5). As shown in the drawings the beams 10 have clamped thereto near their outer ends, jaws 11, for receiving and securing to place the depending short blade sections that go to make up the tools 12, such for instance as are shown and described in the Letters Patent aforesaid. In this connection it may be remarked that to accommodate work of varying radius the jaws may be moved toward or away from the shaft 1.

A description will now be given of a vertical feed mechanism adapted to raise and lower the frame 9, carrying the tools 12. Shown as being supported in bearings 13$^a$, preferably ball bearings, carried by the supports 13, that carry the bearing 6, are rotatable screw rods 14, provided with bevel gears 14$^a$, that mesh with other gears 14$^b$, carried by cross shafts 14$^c$. One of these shafts is provided with a gear 15, meshing with another gear 15ª, and operated by any suitable mechanism. These rotatable screw rods 14, are adapted to coöperate with and raise or lower in their rotation, nuts 16. As clearly illustrated, these nuts 16, comprise a casting encircling the driving shaft 1, bolted to a casting 17, forming a bearing. This bearing 17, provides a race-way for the reception of balls 18, that serve to constitute a ball-bearing between the part 17, and the rotatable sleeve 8. By this arrangement the frame 9, is free to rotate with respect to the nut 16, but capable of being raised and lowered thereby. Arranged beneath the frame 9, are tracks 19, adapted to travel upon which are trucks 20, that support the work 21, to be done. In this connection, it may be remarked that this work is of substantially circular outline, that is work for instance such as arch pieces, ashler work and the like, (see Fig. 6).

A description will now be given of the various tools that are used in the treating of work to be done. A block of stone is placed upon the truck 20, and moved to place beneath the rotating frame 9, and the series of sets of short blade sections (see Fig. 2) inserted between the jaws 11, the said short sections having therebetween spacers 21ª. The jaws are then moved along the beams 10, to the proper radius and clamped to place and the machine operated in order that the work may be weakened after which a stone cutter is given the weakened stone to rough out. This roughed out stone is then treated by another set of short blade sections (see Fig. 3) with the blades comparatively close together and arranged so as to shape or mold the stone. Subsequently the finishing tools are applied to the jaws 11, (see Fig. 4) in which instance the spacers are omitted. In other words the blades act in the capacity of a solid block and produces a finish. It will of course be understood that in these various operations, abrading material is used, and that if desired the finishing tool may be eliminated if the character of the work does not require it.

It will be observed that the series of beams 10, are all equipped with tools 12, and successively operate upon one or more pieces of work, arranged beneath the rotating frame. It will be further observed that during the rotation of the frame 9, the same may be gradually lowered by means of the screw threaded shaft 14, coöperating with the nuts 16, in order that the tools 12, may be properly fed to work to be done. Obviously a reverse movement of the operating mechanism will serve to move the tools away from the work. By virtue of the fact that the tools are traveling in a circle an equal pressure is maintained upon the work by the tools at all times and further there is no lost motion as in reciprocating stone cutters.

What I claim is:—

1. Apparatus of the class described, comprising a single rotatable and vertically arranged shaft, a casting encircling said shaft, comprising a series of nuts, a bearing connected with said casting, a sleeve feathered to said shaft, said sleeve having ball-bearing and swivel relation with said bearing, a horizontally arranged frame fixed to said sleeve, a series of sets of blade sections depending from and rigidly clamped to said frame and screw rods coöperating with said nuts for moving said blade sections toward or away from work to be done.

2. Apparatus of the class described comprising a rotatable and vertically arranged shaft, a series of nuts surrounding said shaft, raising and lowering screw rods coöperating with said nuts, a sleeve feathered to and rotatable with said shaft and having swivel connection with respect to said nuts, a horizontally arranged frame fixed to and rotatable with said sleeve said frame comprising a series of flat undersided beams, radiating from said sleeve, a series of sets of adjustable separately removable blade sections depending from said frame and means for clamping said blade sections up against the flat undersides of said beams whereby said blade sections may be moved toward or away from the center of the apparatus.

3. Apparatus of the class described comprising a rotatable and vertically arranged shaft, a series of nuts surrounding said shaft, raising and lowering screw rods coöperating with said nuts, a sleeve feathered to and rotatable with said shaft and having swivel connection with respect to said nuts, a horizontally arranged frame fixed to and rotatable with said sleeve, a series of sets of adjustable separately removable blade sections depending from said frame and means for clamping said blade sections to the underside of said frame so that they may be moved toward or away from the center of the apparatus.

In testimony whereof I have hereunto signed my name.

JAMES E. W. BRYNING.

In the presence of—
H. J. REARDON,
P. S. DUNN.